United States Patent
He

(10) Patent No.: US 10,404,078 B2
(45) Date of Patent: Sep. 3, 2019

(54) SWITCHING FABRIC FOR ENERGY STORAGE AND POWER CONVERSION

(71) Applicant: Amber Kinetics, Inc., Union City, CA (US)

(72) Inventor: Mike M. He, San Jose, CA (US)

( * ) Notice: Subject to any disclaimer, the term of this patent is extended or adjusted under 35 U.S.C. 154(b) by 477 days.

(21) Appl. No.: 15/192,645

(22) Filed: Jun. 24, 2016

(65) Prior Publication Data

US 2016/0380445 A1    Dec. 29, 2016

Related U.S. Application Data

(60) Provisional application No. 62/185,437, filed on Jun. 26, 2015.

(51) Int. Cl.
| | | |
|---|---|---|
| *H02J 7/00* | (2006.01) | |
| *H02J 7/02* | (2016.01) | |
| *H02J 7/04* | (2006.01) | |
| *H02J 3/30* | (2006.01) | |
| *H02J 15/00* | (2006.01) | |

(52) U.S. Cl.
CPC .............. *H02J 7/0019* (2013.01); *H02J 3/30* (2013.01); *H02J 7/022* (2013.01); *H02J 7/045* (2013.01); *H02J 15/00* (2013.01); *Y02E 60/16* (2013.01)

(58) Field of Classification Search
CPC .................................... H02J 1/10; H02J 1/102
See application file for complete search history.

(56) References Cited

U.S. PATENT DOCUMENTS

| | | | |
|---|---|---|---|
| 6,459,171 B1 * | 10/2002 | Leifer ....................... | H02J 1/10 |
| | | | 307/24 |
| 7,612,466 B2 * | 11/2009 | Skutt ................... | B60L 11/1842 |
| | | | 307/29 |
| 8,286,006 B2 | 10/2012 | Kreiner et al. | |
| 8,354,825 B2 | 1/2013 | Lee et al. | |
| 8,643,325 B2 | 2/2014 | Yang | |
| 2011/0140649 A1 | 6/2011 | Choi | |
| 2012/0194138 A1 | 8/2012 | Uno et al. | |
| 2012/0274145 A1 | 11/2012 | Taddeo | |
| 2013/0002026 A1 | 1/2013 | Mizutani et al. | |
| 2013/0125546 A1 | 5/2013 | Barmeier et al. | |
| 2013/0285491 A1 | 10/2013 | Kuznetsov | |
| 2014/0117938 A1 | 5/2014 | Ouzaarou et al. | |
| 2014/0361624 A1 * | 12/2014 | Ault ........................ | H02J 9/062 |
| | | | 307/65 |

OTHER PUBLICATIONS

PCT Invitation to Pay Additional Fees and, Where Applicable, Protest Fee for PCT/US2016/037770, dated Aug. 2, 2016, 2 pages.
PCT International Search Report and Written Opinion for PCT/US2016/037770, dated Oct. 7, 2016, 25 Pages.

* cited by examiner

*Primary Examiner* — Fritz M Fleming
(74) *Attorney, Agent, or Firm* — Soquel Group LLC

(57) ABSTRACT

An energy storage system operable in a charging phase and in a discharging phase is disclosed. The energy storage system includes M energy storage units and N power converters, where M is at least two and N is at least one. The energy storage system also includes a switching fabric that reconfigurably couples the energy storage units to the power converters and a controller that reconfigures the switching fabric.

26 Claims, 5 Drawing Sheets

SWITCHING FABRIC FOR ENERGY STORAGE AND POWER CONVERSION

TECHNICAL FIELD

This description generally relates to energy storage, and particularly to interconnecting multiple energy storage units in an energy storage system.

BACKGROUND

Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and automatic generation control (AGC) on thermal generators allow for generation that matches high and variable load. However, despite the availability of such techniques, there are often instances where energy storage is important for meeting energy load.

Currently existing energy storage systems all have drawbacks of one form of another. Size, price, storage efficiency, efficacy, and safety are all concerns when designing an energy storage unit of an energy storage system. Generally, smaller size, lower price, reduced loss in both inputting energy for storage and extracting it for distribution, reduced losses for continuous operation, and safe disposal are all preferred characteristics of energy storage units.

Additionally, energy storage systems use electrical hardware to convert the power provided by the energy storage units to an acceptable output form (e.g., 120V, 60 Hz, three-phase alternating current signal). Generally, larger circuitry, capable of handling larger amount of power is preferred.

Storage units can be designed for improved characteristics by changing the physical size and/or storage capacity of the unit. There may be preferred unit sizes or capacities that lend to improved efficiency, cost, safety, or other desired characteristics. The preferred sizes or capacities may vary between technology, application, site environment, or other considerations of the energy storage system. The preferred sizes or capacities or the storage unit may often conflict with the preferred size or rating of the electrical conversion unit, such that matching the storage unit and the power conversion unit, referred to hereinbelow as a power converter, constrains the design.

Many energy storage technologies are better suited for interfacing with AC electricity rather than DC electricity. For example, mechanical forms of energy storage such as flywheels, compressed air, pumped hydro, etc. convert electricity to mechanical energy and vice versa through the use of a motor/generator, which is typically more efficient and reliable as an AC machine. For technologies where AC electricity is the natural initial output of a storage unit, power converters are required to convert the AC output of the storage unit to a form acceptable by its application, such as DC electricity or AC electricity of a different frequency or voltage.

Multiple storage units cannot easily be connected together on a common bus, because AC electricity is incompatible between sources of different frequency. Therefore, typically, each storage unit must be connected to its own power converter.

For purposes of reliability and cost it would be desirable for multiple storage units to connect to a single power converter or to multiple power converters through the use of a reconfigurable switching fabric. The ability to switch the flow of electric energy between storage units and power converters, referred to herein as a reconfigurable switching fabric, or simply switching fabric, affords several key advantages, as described below.

First, it allows an energy storage unit and a power converter to be independently designed and sized. The optimal size of an energy storage unit is a detailed engineering decision, and may not necessarily match the optimal size for a power converter. The switching fabric allows the storage units and power converters to be independently optimized and connected together appropriately for operation.

Second, it allows energy storage units to selectively charge or discharge to achieve improved performance as a whole system. For example, individual units may be charged or discharged in turn to balance state of charge, losses and dissipation, temperature, charge/discharge cycles, lifetime degradation, or any other desired characteristic.

Third, it improves fault tolerance and reliability by enabling many storage units and power converters to interconnect to introduce redundancy in the event of failure of any individual component.

Thus, it is with respect to these considerations and others that the present invention has been made.

SUMMARY

An energy storage system operable in a charging phase and in a discharging phase is disclosed. The energy storage system includes M energy storage units and N power converters, where M is at least two and N is at least one. The energy storage system also includes a switching fabric that reconfigurably couples the energy storage units to the power converters and a controller that reconfigures the switching fabric. The controller is capable of implementing different switching configurations during the charging and discharging phases.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Flywheel Energy Storage System

Figure 1:
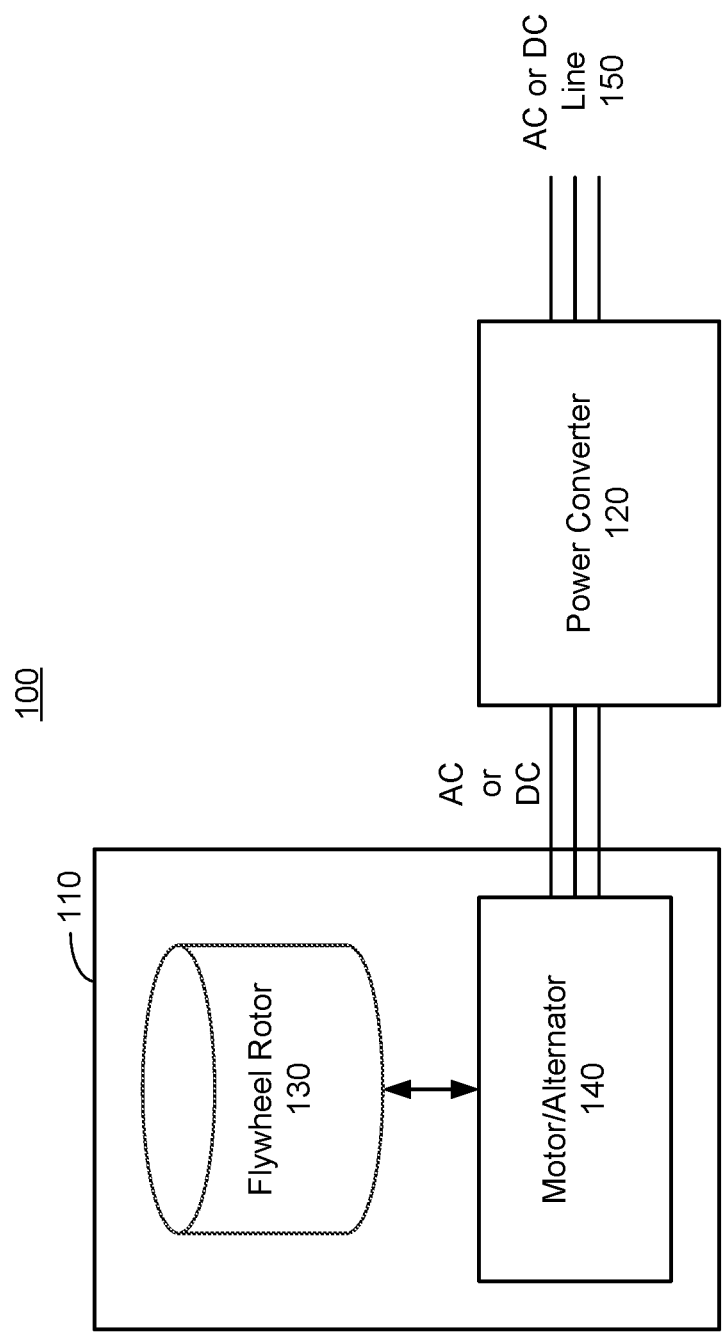
FIG. 1 is a block diagram of a flywheel energy storage system according to one embodiment.

FIG. 1 is a block diagram of a flywheel energy storage system 100 according to one embodiment. The energy storage system is operable in a charging phase, an idle phase, and a discharging phase. During the charging phase energy is provided to the energy storage system and stored in a storage element of the energy storage system. Energy may be provided by an electric power grid such as from a public utility or a micro grid, from a power station or from another energy source. As used herein the term electric power grid refers to an interconnected network for delivering electricity from suppliers to consumers and includes public utilities, micro grids and individual power generating stations. During the idle phase the energy storage system is decoupled from the energy source and energy is neither provided to the energy storage system, nor extracted from the energy storage system. During the discharging phase, the stored energy is extracted from the energy storage system (e.g., energy is extracted from the energy storage system and provided to the power grid).

The energy storage system includes an energy storage unit 110, a power converter 120, and an AC line 180. Energy is stored in or drawn through an AC line 150, such as a conventional three-phase 60 Hz line. In certain embodiments, power converter 120 converts the input alternating current into an alternating current acceptable to the motor/alternator 140. Alternatively, in other embodiments, converter 120 converts the alternating current from the motor/alternator 140 into a direct current output.

The energy storage unit 110 includes a motor/alternator 140 and a flywheel rotor 130. The motor/alternator 140 converts between electrical and mechanical energy, so that energy can be stored in or drawn from the flywheel rotor 130. The motor/alternator 140 is physically coupled to the flywheel rotor 130 either directly or indirectly using a shaft. The motor/alternator 140 is coupled to the remainder of the system 100 via wires or other electrical couplings. Generally, although only one of each component is shown, in practice a flywheel energy storage system 100 may include multiples of each individual component.

It may be appreciated by one skilled in the art that while energy storage unit 110 is illustrated and described hereinabove as a flywheel-based energy storage system, the invention is not so limited. Energy storage unit 110 may be based on any energy storage technology, including inter alia solar cells, wind turbines, hydroelectric, and battery. Thus, the illustrative example of a flywheel-based energy storage unit is not intended to be limiting on the underlying technology used for this purpose.

Switching Fabric

Figure 2A:
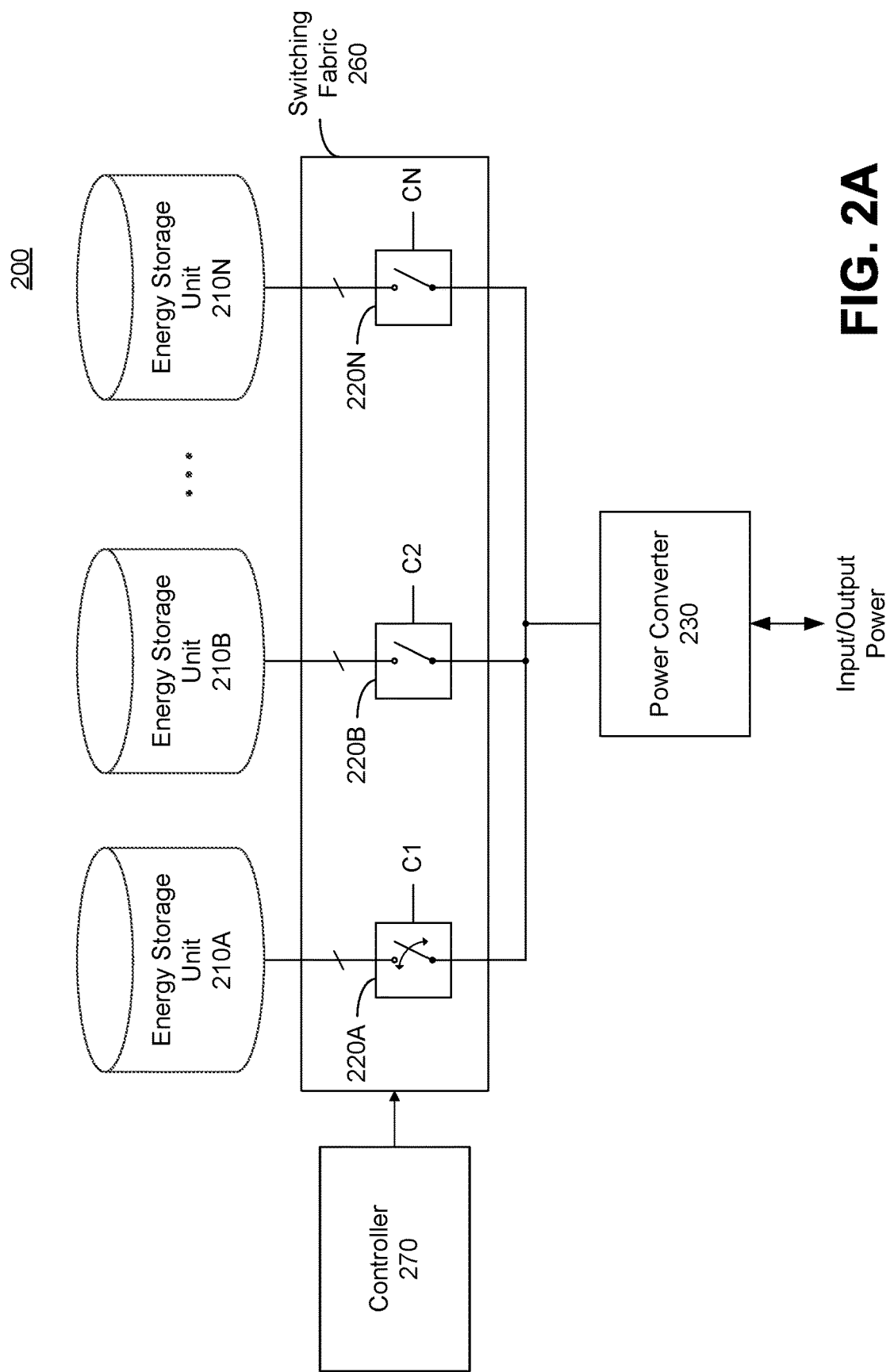
FIG. 2A is a block diagram of multiple energy storage units connected to a single inverter, according to one embodiment.

FIG. 2A illustrates an energy storage system 220 multiple energy storage units connected to a single power converter 230, according to one embodiment. The diagram of FIG. 2A shows multiple energy storage units (e.g., N energy storage units, where N is an integer number greater or equal than 2) including a first energy storage unit 210A, a second energy storage unit 210B, and an n-th energy storage unit 210N connected to a power converter 230 via a switching fabric 260. The switching fabric reconfigurably couples each energy storage unit 210 to the power converter 230. The switching fabric includes N switches 220A-220N.

The first energy storage unit 210A is connected to a first switch 220A, the second energy storage unit 210B is connected to a second switch 220B, and the n-th energy storage unit 210N is connected to an n-th switch 220N. The first switch 220A is controlled by a first control signal C1, the second switch 220B is controlled by a second control signal C2, and the n-th switch 220N is controlled by an n-th control signal CN. All switches are then connected to the input of a single power converter 230. Energy storage system 200 may include a controller 270 that generates the control signals C1 through CN that control each of switches 220A-220N of switching fabric 260. Using signals CI through CN, the controller is capable of reconfiguring the switching fabric to couple any energy storage unit(s) to the power converter 230.

Power converter 230 of energy storage system 200 may then be connected to an electric power grid. Energy storage units 210A-210N are charged using energy drawn from the electric power grid. The energy storage system 200 also provides energy to the electric power grid (e.g., when there is a shortage of power or to stabilize the electric power grid).

Controller 270 manages the switching of power between energy storage unit 210A-210N and power converter 230 by issuing signals to open and close via control signals C1-CN to switches 220A-220N that controls the charging and discharging process. Controller 270 may include additional signals for monitoring or control. In certain embodiments, controller 270 is implemented with digital electronics components that include a processor and non-volatile memory for storing program code and data. The processor may be a general purpose processor or microprocessor, a field programmable gate array (FPGA), or other programmable or configurable electronics component. In addition to controlling the switching of power, controller 270 may perform additional functions such as inter alia receiving data from sensors, monitoring the state of charge, controlling associated sub-components, recording data, and receiving control signals, In certain embodiments, switching fabric 260 and controller 270 are implemented in the same device or electronics unit. In other embodiments they are separate units. Although controller 270 is not shown in FIGS. 2B and 2C hereinbelow, it may be appreciated that in general controller 270 implements a switching policy, i.e. the logic that controls the opening and closing of switches in switching fabric 260.

In some embodiments, the design of the energy storage units attempts to optimize the relationship between amount of energy that can be stored and the price of manufacturing the storage unit. For instance, for a flywheel rotor, the price of manufacturing a rotor may increase faster than linear for as the energy storage capabilities of the energy storage unit increases. That is, for larger energy storage capabilities, it might be more cost effective to manufacture two smaller energy storage units with half of the total energy storage capability instead of one larger energy storage unit. For instance, for a system with an total energy storage capability of 40 kWh, it may be more cost effective to manufacture two energy storage units, each having an energy storage capability of 20 kWh, instead of manufacturing one energy storage unit having an energy storage capability of 40 kWh.

In some cases, it may be more cost effective to manufacture a larger converter unit having a larger power output than manufacturing multiple smaller converter units each having a fraction of the power output of the larger converter unit. For instance, for a system with a power capability of 10 kW, it may be more cost effective to manufacture a single converter unit with a power output of 10 kW, instead of two converter units, each with a power output of 5 kW.

As such, the power capability of system 200 is determined by the power output of the single converter unit 230 while the energy storage capability is determined by the cumulative energy storage capability of energy storage units 210A-210N.

To operate energy storage system 200 of FIG. 2A, switches 220A-220N are controlled so that at most one switch is closed at any given time. The switches may be sequentially closed and opened to allow access to each individual energy storage unit 210. There are three main operations that can be performed by the energy storage system 200: (i) charging, (ii) idling, and (iii) discharging.

To charge energy storage system 200, energy storage units 210 are sequentially charged. To charge first energy storage unit 210A, first switch 220A is closed while switches 220B and 220N are open, and power is supplied through the power converter 230. When first energy storage unit 210A is charged, first switch 220A is opened. Similarly, to charge the second energy storage unit 220A, second switch 220B is closed while the switches 220A and 220N are open, and power is supplied through power converter 230. When second energy storage unit 210B is charged, second switch 220B is opened. This process is repeated for each energy storage unit 210 of energy storage system 200.

During the idle phase, after the storage units 210 are charged, every switch 220A-220N is kept open. During this phase, power is neither input, nor output through power converter 230.

To discharge energy storage system 200, each of the energy storage units 210 is sequentially discharged. That is, the switching fabric 260 is reconfigured to couple the energy storage units 210 to the power converter in a time-multiplexed fashion. For instance, first energy storage unit 210A may be discharged first, followed by second energy storage unit 210B and so forth. To discharge the first storage unit 210A, first switch 220A is closed to couple first storage unit 210A to power converter 230, while switches 220B and 220N are open.

Generally, if the first energy storage unit has an energy storage capacity of E1, and the power converter has a power rating of P, the first energy storage unit may be discharged for an amount of time T1 equal to:

$$T1 = \frac{E1}{P} \quad (1)$$

For instance, if first energy storage unit 210A has an energy storage capacity of 20 kWh, and power converter 230 has a power rating of 10 kW, then first energy storage unit 210A may be discharged for 2 hours.

Similarly, to discharge the second energy storage unit, the second switch 220B is closed while the other switches 220A and 220N are open. By closing the second switch 220B, the second energy storage unit 210B is coupled to the power converter 230. This process may repeated for each energy storage unit until every energy storage unit is discharged, or until power from the energy storage system is no longer needed.

Energy storage system 200 may provide power for an amount of time equal to:

$$T_{total} = \sum_{k=1}^{N} \frac{Ek}{P} \quad (2)$$

where Ek is the energy storage capacity of the k-th energy storage unit, and P is the power rating of the power converter 230.

In some embodiments, the sequence in which the energy storage units are discharged may improve operational performance; for example, by balancing state of charge, loss dissipation, charging/discharging cycles, or other characteristics among a set of energy storage units.

Figure 2B:
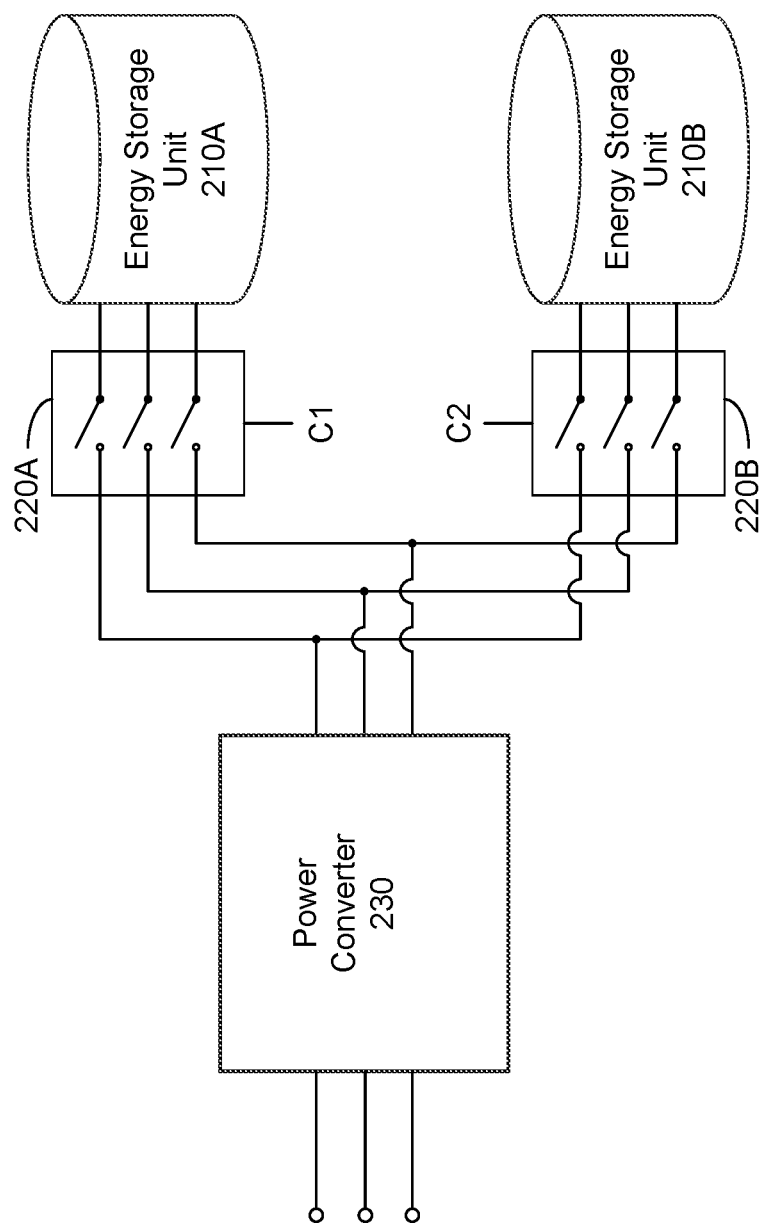
FIG. 2B is a circuit diagram with two energy storage unit connected to a single inverter, according to one embodiment.

FIG. 2B illustrates a circuit diagram for an embodiment of energy storage system 200 with two energy storage units 210A-210B and a single power converter 230. Although only two energy storage units 210A and 210B are shown in the energy storage system of FIG. 2B, any number of energy storage units may be used instead.

In the example of FIG. 2B, each energy storage unit 210 outputs three-phase AC power. Each energy storage unit 210A and 210B is connected to a switch 220A or 220B, respectively. Since energy storage units 210 output a three-phase signal, each energy storage unit 210 is connected to a triple pole, single throw (3PST) switch. In some embodiments, other configurations, such as a triple pole, triple throw (3P3T) switch may be used. Switches 220A and 320B are then connected to a power converter 230. There are a wide variety of embodiments of power converter 230. For example, in one embodiment, power converter 230 may include two back to back three-phase full-wave bridge rectifiers and a capacitor. In other embodiments, a three-phase full-wave inverter using a center-tapped transformer, or a three-phase half-wave inverter, may be used. Further, power converter 230 may convert the three-phase AC power from energy storage units 210A and 210B to a different output form, e.g. DC power. Thus, while power converter 230 is illustrating as having 3 output lines, in fact this may be 1, 2, 3 or another number of output lines as required by the electric power grid or other energy network to power converter 230 connects.

Figure 2C:
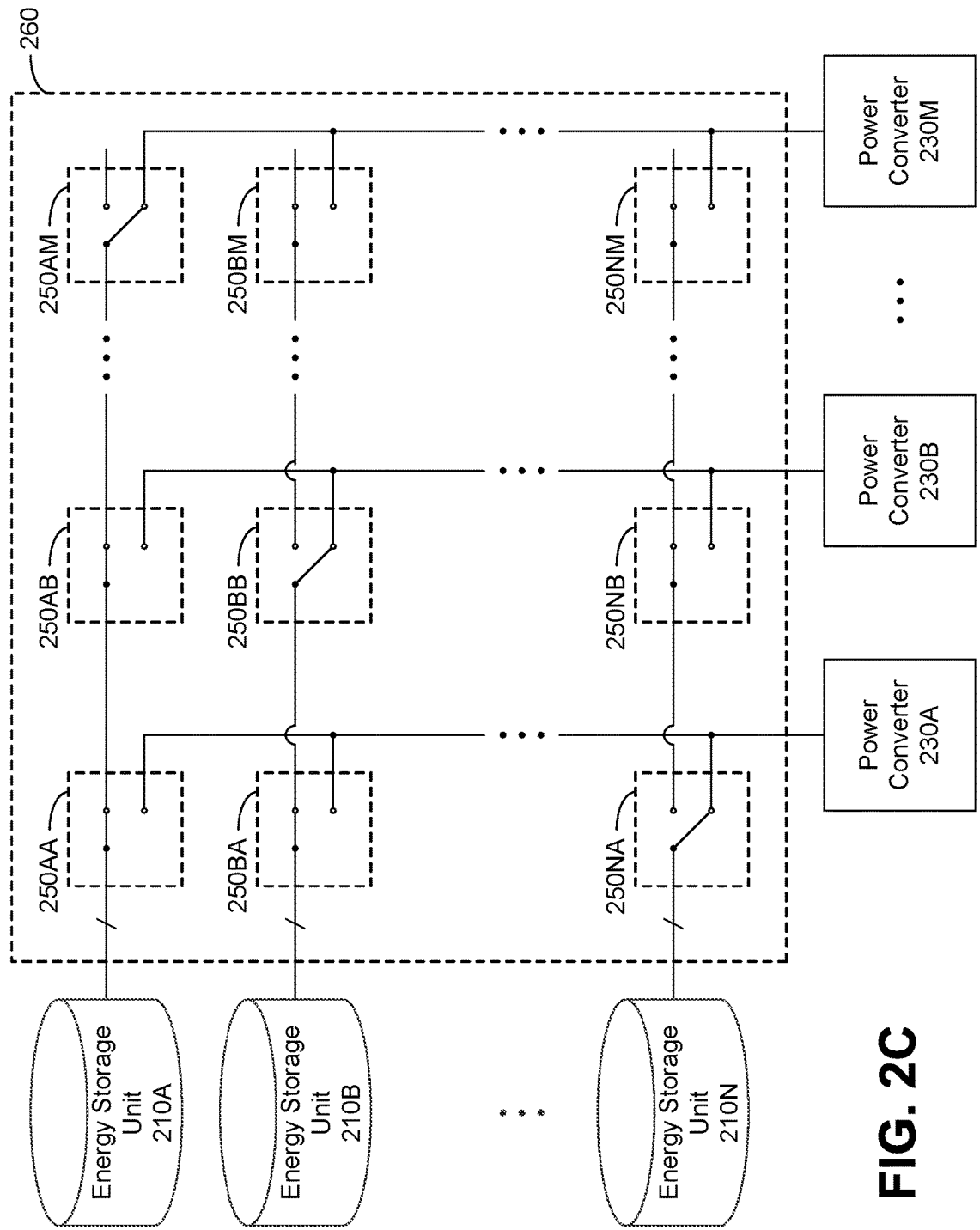
FIG. 2C is a block diagram of multiple energy storage units connected to multiple converters, according to one embodiment.

FIG. 2C illustrates an embodiment of energy storage system 200 with N energy storage units 210A-210N and M power converters 230A-230M. Each of the N energy storage units 210A-210N is connectable to each of the M power converters 230A-230M via switching fabric 260. In some embodiments, the number N of energy storage units 210 is larger than the number M of power converters 230. In other embodiments, M may be greater than N. In yet other embodiments, N or M may be 1, i.e. there may be a single energy storage unit 210 or a single power converter 230.

In some embodiments, during the discharging phase of the energy storage unit 200, not more than one energy storage unit 210 is simultaneously coupled to any power converter 230. That is, the switching fabric 260 may be a blocking switching fabric. Alternatively, one energy storage unit 210 may be simultaneously coupled to more than one power converter 230. That is, the switching fabric 260 may be a non-blocking fabric.

In some embodiments, during the charging phase, not more than one power converter can be simultaneously coupled to each energy storage unit. In other embodiments, one power converter 230 may be simultaneously coupled to more than one energy storage unit 210.

Referring back to the diagram of FIG. 2C, energy storage unit 210A is coupled to M switches 250AA through 250AM. In the embodiment of FIG. 2C, the M switches are double throw switches connected in series. In other embodiments, single throw switches connected in parallel may be used instead. Additionally, in the diagram of FIG. 2C a single line is used to depict all the phases of the AC signal. In the case that energy storage unit 210 outputs a three-phase AC signal, three power lines emerge from energy storage unit 210, one for each phase of the AC signal, and switches 250 are triple pole switches, one pole for each phase of the AC signal.

Switch 250AA is connected to power converter 230A, switch 250AB is connected to power converter 230B, and so on. Similarly, energy storage unit 210B is coupled to M switches 250BA through 250BM, where switch 250A is connected to power converter 230A, switch 250BA is connected to power converter 230B, and so on. This configuration is repeated for each of the energy storage units. That is, each energy storage unit 210 is coupled to M switches, and each of the M switches is connected to a different power converter 230.

During operation of energy storage system 200, a given energy storage unit 210 may be connected to at most one power converter 230, and any given power converter 230 may be connected to at most one energy storage unit 210. For instance, to charge or discharge the first energy storage unit 210A, one of the switches 250AA-250AM is closed, i.e. it allows energy to flow to a corresponding power converter 230. If switch 250AA is closed, power converter 230A is used to charge or discharge energy storage unit 210A. Alternatively, if switch 250AB is closed, power converter 230B is used to charge or discharge energy storage unit 210A.

In the embodiment of FIG. 2C, controller 260 implements a switching policy that controls M×N switches in real-time. Thus, switching fabric 260 is reconfigured in real-time to implement a specific switching policy. This approach beneficially increases reliability of the energy storage system 200. Having multiple power converters and multiple energy storage units add redundancy to the system. If any of the energy storage units 210A-210N or power converters 230A-23-M malfunctions, the failing energy storage unit or power converter can be taken offline for maintenance without impacting the performance of the energy storage system.

Figure 3:
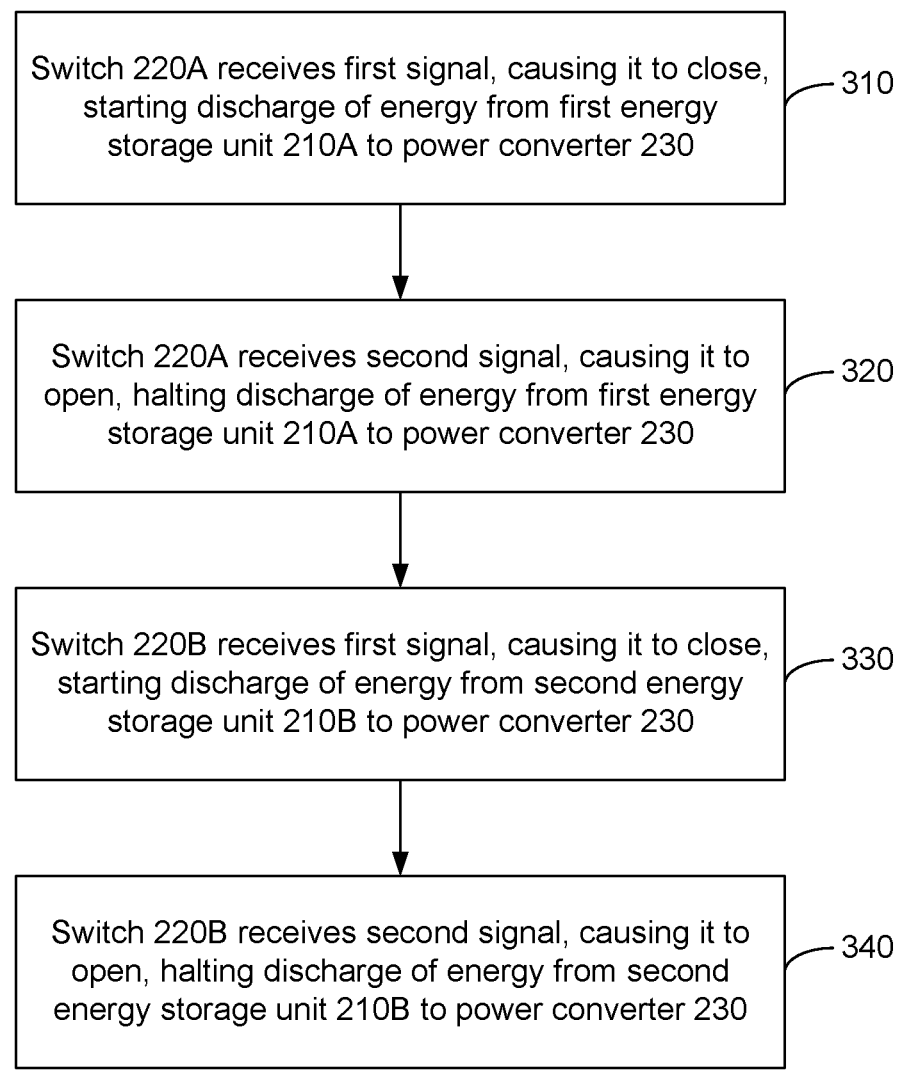
FIG. 3 is a flow diagram of a process for providing power by an energy storage system, according to one embodiment.

FIG. 3 is a flow diagram of a method 300 for providing power by an energy storage system, according to one embodiment. The switching policy in process 300 is implemented by controller 270. Thus, switching fabric 260 may be considered to be reconfigurable as controller 270 may implement a wide variety of switching policies, including inter alia those described herein. Generally, method 300 corresponds most directly to the steps performed by the switching fabric 260 illustrated in FIG. 2B, although it also applies to FIGS. 2A and 2B as well.

Generally, method 300 illustrates a sequence of steps performed by energy storage system 200, under the control of controller 270, to extract energy from two energy storage units.

At step 310 a signal is received from control signal C1 by switch 220A which causes switch 220A to close, thus enabling energy to discharge from a first energy storage unit 210A to power converter 230. The discharging phase continues for a period of time until energy storage unit 210A is fully or partially discharged. Then, at step 320 a second a signal is received from control signal C1 by switch 220A that causes switch 220A to open, thus halting the discharge of energy from energy storage unit 210A. Energy flowing through power converter 230 during the discharging phase may, for example, be converted to a 120V, 60 Hz three-phase AC signal.

Next, at step 330, a signal is received from control signal C2 by switch 220B which causes switch 220B to close, thus enabling energy to discharge from a second energy storage unit 210B to power converter 230. The discharging phase continues for a period of time until energy storage unit 210B is fully or partially discharged. Then, at step 340 a second signal is received from control signal C2 by switch 220B that causes switch 220B to open, thus halting the discharge of energy from energy storage unit 210B.

For instance, if first energy storage unit 210A can store 20 kWh of energy and the second energy storage unit 310B can store 20 kWh of energy, and the energy storage system outputs power at 10 kW (i.e., the power converter can output power at 10 kW), then the energy storage system may run for 4 hours (20 kWh/10 kW+20 kWh/10 kW=4 h). In this exemplary system, the first energy storage unit 210A may be discharged for the first 2 hours with a power output of 10 kW, and the second energy storage unit 10B may be discharged for the second 2 hours with a power output of 10 kW.

Additional Configuration Considerations

Even though flywheel rotors are used as an example of an energy storage unit, other types of energy storage units may be used. For instance, energy storage units storing thermal energy, compressed air, or geothermal energy may be used instead. Further, an energy storage system may use energy storage units that store energy in different forms. For example, an energy storage system may include an energy storage unit that stores kinetic energy in a rotor, and an energy storage unit that stores energy as compressed air.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An energy storage system operable in a charging phase and in a discharging phase, the energy storage system comprising:
    N energy storage units, wherein N is at least two, the energy storage units configured to output a three-phase AC signal;
    M power converters, wherein M is at least one; and
    a switching fabric that reconfigurably couples energy storage units to power converters, wherein the switching fabric is configured to receive and switch a three-phase AC signal.

2. The energy storage system of claim 1, further comprising:
    a controller that controls the charging phase and discharging phase.

3. The energy storage system of claim 2, wherein the switching fabric comprises:
    N×M switches such that each energy storage unit of the N energy storage units is connected to each power converter of the M power converters via a different switch; and
    a control signal connected to each switch that receives a control signal from the controller that indicates if the switch is be opened or closed.

4. The energy storage system of claim 2, wherein the controller is capable of reconfiguring the switching fabric to couple any energy storage unit to any power converter.

5. The energy storage system of claim 2, wherein, during the discharging phase, the controller reconfigures the switching fabric to couple at least two energy storage units of the plurality of energy storage units to a power converter of the plurality of power converters in a time-multiplexed fashion.

6. The energy storage system of claim 2, wherein the controller reconfigures the switching fabric in order to balance energy storage among the N energy storage units.

7. The energy storage system of claim 1, wherein the number of energy storage units in the plurality of energy storage units is greater than the number of power converters in the plurality of power converters.

8. The energy storage system of claim 1, wherein M is at least two.

9. The energy storage system of claim 1, wherein the energy storage system is coupled to an electric power grid.

10. The energy storage system of claim 1, wherein, during the discharging phase, not more than one energy storage unit of the N energy storage units can be simultaneously coupled to each power converter of the M power converters.

11. The energy storage system of claim 1, wherein, during the discharging phase, each energy storage unit of the N energy storage units can be simultaneously coupled to more than one power converter of the M power converters.

12. The energy storage system of claim 1, wherein, during the charging phase, not more than one power converter of the M power converters can be simultaneously coupled to each energy storage unit of the N energy storage units.

13. The energy storage system of claim 1, wherein, during the charging phase, each power converter of the M power converters can be simultaneously coupled to more than one energy storage unit of the N energy storage units.

14. The energy storage system of claim 1, wherein the switching fabric is blocking.

15. The energy storage system of claim 1, wherein the switching fabric is non-blocking.

16. The energy storage system of claim 1, wherein the energy storage system outputs three-phase AC electricity with a frequency of 50 or 60 Hz.

17. The energy storage system of claim 1, wherein, during the discharging phase, the M power converters receive AC electricity from the N energy storage units and output DC electricity.

18. The energy storage system of claim 17, further comprising:

a second plurality of power converters coupled to the N power converters, the second plurality of power converters configured to convert the DC electricity to AC form at a predetermined frequency.

19. The energy storage system of claim 1, wherein, during the discharging phase, the plurality of power converters receive AC electricity from the plurality of energy storage units and output electricity in AC form at a predetermined frequency.

20. The energy storage system of claim 1, wherein the N energy storage units store energy using flywheel rotors.

21. The energy storage system of claim 1, wherein the N energy storage units store energy using a compressed fluid.

22. The energy storage system of claim 1, wherein all energy storage units of the N energy storage units store energy using the same physical mechanism.

23. The energy storage system of claim 1, wherein at least two energy storage units of the N energy storage units store energy using different physical mechanisms.

24. The energy storage system of claim 1, wherein at least two energy storage units of the N energy storage units have different energy storage capacities.

25. The energy storage system of claim 1, wherein at least two power converters of the M power converters have different power ratings.

26. A method for operating energy storage units in an energy storage system, comprising:

configuring a switching fabric to electrically couple a first energy storage unit to a power converter, the first energy storage unit configured to discharge via a three-phase AC signal;

maintaining the electrical coupling between the first energy storage unit and the power converter for a first predetermined amount of time;

reconfiguring the switching fabric to electrically couple a second energy storage unit to the power converter, the second energy storage unit configured to charge or discharge via a three-phase AC signal; and maintaining the electrical coupling between the second energy storage unit and the power converter for a second predetermined amount of time.

* * * * *